(12) United States Patent
Shome

(10) Patent No.: US 9,010,688 B2
(45) Date of Patent: Apr. 21, 2015

(54) STRUCTURAL JOINT HAVING CONTINUOUS SKIN WITH INSIDE AND OUTSIDE STRINGERS

(75) Inventor: Moushumi Shome, Kent, WA (US)

(73) Assignee: The Boeing Company, Chicago, IL (US)

( * ) Notice: Subject to any disclaimer, the term of this patent is extended or adjusted under 35 U.S.C. 154(b) by 222 days.

(21) Appl. No.: 13/367,782

(22) Filed: Feb. 7, 2012

(65) Prior Publication Data

US 2013/0200215 A1 Aug. 8, 2013

(51) Int. Cl.
*B64C 1/00* (2006.01)
*B64C 1/12* (2006.01)
*B64C 3/26* (2006.01)

(52) U.S. Cl.
CPC ... *B64C 1/12* (2013.01); *B64C 3/26* (2013.01); *Y10T 29/49622* (2015.01); *Y10T 403/18* (2015.01)

(58) Field of Classification Search
USPC .......................................... 244/119, 131, 132
See application file for complete search history.

(56) References Cited

U.S. PATENT DOCUMENTS

| | | | | |
|---|---|---|---|---|
| 4,828,202 A * | 5/1989 | Jacobs et al. | ............... | 244/117 R |
| 5,086,996 A * | 2/1992 | Roeder et al. | .................. | 244/119 |
| 5,242,523 A * | 9/1993 | Willden et al. | ............... | 156/285 |
| 6,766,984 B1 * | 7/2004 | Ochoa | ............................ | 244/119 |
| 7,871,040 B2 * | 1/2011 | Lee et al. | ....................... | 244/119 |
| 8,038,099 B2 * | 10/2011 | Anast et al. | .................... | 244/119 |
| 8,186,622 B2 * | 5/2012 | Munday | ........................ | 244/132 |
| 8,371,529 B2 * | 2/2013 | Tacke et al. | .................... | 244/119 |
| 8,424,806 B2 * | 4/2013 | Outon Hernandez et al. | ............................ | 244/123.1 |
| 8,453,975 B2 * | 6/2013 | Dietrich et al. | ................ | 244/132 |
| 8,490,920 B2 * | 7/2013 | Karem | ............................ | 244/119 |
| 2009/0084899 A1 | 4/2009 | Kismarton et al. | | |

OTHER PUBLICATIONS

Jegley, D.C. et al., "Structural Response and Failure of a Full-Scale Stitched Graphite-Epoxy Wing," AIAA/ASME/ASCE/AHS 42nd Structures, Structural Dynamics and Materials Conference, AIAA Paper No. 2001-1334-CP, 2001.

* cited by examiner

*Primary Examiner* — Brian M O'Hara
*Assistant Examiner* — Keith L Dixon
(74) *Attorney, Agent, or Firm* — Michael J. Baldauff, Jr.; Baldauff IP, LLC

(57) ABSTRACT

Apparatus and methods provide for a structural joint utilizing overlapping blade stringers coupled to opposing sides of a continuous skin. According to embodiments described herein, a structural joint includes a number of inside blade stringers associated with a first component are coupled to an inside surface of a continuous skin. A number of outside blade stringers associated with a second component may be coupled to an outside surface of the continuous skin. The inside blade stringers and outside blade stringers may overlap on opposing surfaces of the continuous skin.

18 Claims, 5 Drawing Sheets

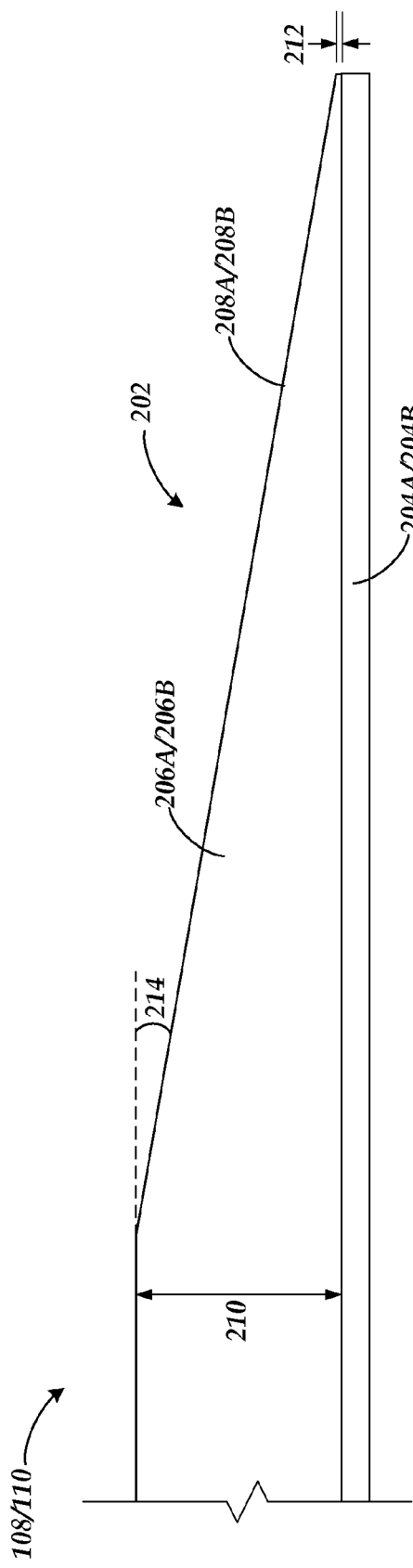
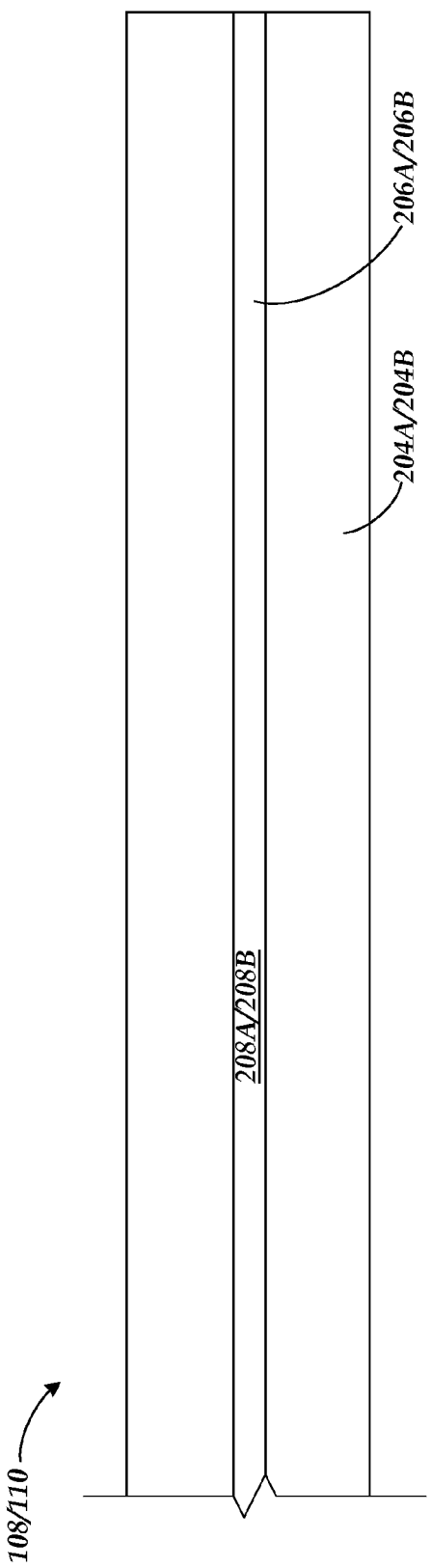
FIG. 2
FIG. 3

STRUCTURAL JOINT HAVING CONTINUOUS SKIN WITH INSIDE AND OUTSIDE STRINGERS

BACKGROUND

Aircraft, as well as other types vehicles and structures, utilize stringers to provide strength and stiffening characteristics to skin that covers various surfaces of the aircraft or structure. As two components converge at a joint, conventional techniques include terminating the stringers from each component and skin at one or more metallic splice plates that provide the desired reinforcement to the joint. When utilizing composite materials for the stringers and skin, the potential for delamination exists at these joints where increased loads and corresponding moments are common. To accommodate excessive forces at these joints and prevent delamination and composite failure, these conventional joints and associated splice plates are commonly complex and undesirably heavy.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Apparatus and methods provide for a structural joint coupling two components with a continuous skin and overlapping inside and outsides stringers. According to one aspect of the disclosure provided herein, a structural joint may include a continuous skin with an inside and an outside surface. A number of inside blade stringers may be coupled to the inside surface of the continuous skin and positioned parallel to each other. A number of outside blade stringers may be coupled to the outside surface of the continuous skin and positioned parallel to one another. The inside and outside stringers may have joint ends that overlap on opposing sides of the continuous skin.

According to another aspect, a method for joining two structures may include providing a number of inside blade stringers, each having an inside stringer base flange and an inside stringer web projecting away from the inside stringer base flange and tapering to a reduced height at a joint end of the stringer. The inside blade stringers are coupled to a first structure. The inside stringer base flange of each inside blade stringer is coupled to an inside surface of a continuous skin. A number of outside blade stringers may be provided, each of which may include an outside stringer base flange and an outside stringer web projecting away from the outside stringer base flange and tapering to a reduced height at a joint end of the outside blade stringer. The outside blade stringers may be coupled to a second structure being joined to the first structure. The outside stringer base flange of each outside blade stringer may be coupled to an outside surface of the continuous skin. The joint ends of each inside and outside blade stringer may overlap on opposing sides of the continuous skin.

According to yet another aspect, a structural joint may include a continuous skin, a number of inside blade stringers, and a number of outside blade stringers. The inside blade stringers may be positioned parallel to one another and may each include an inside stringer base flange coupled to an inside surface of the continuous skin and an inside stringer web having an open edge spaced a distance from the inside stringer base flange. This distance may decrease to a reduced height at a joint end of each inside blade stringer. The outside blade stringers may similarly be positioned parallel to one another and may each include an outside stringer base flange coupled to an outside surface of the continuous skin and an outside stringer web having an open edge spaced a distance from the outside stringer base flange. This distance may decrease to a reduced height at a joint end of each outside blade stringer. The joint ends of the inside blade stringers and the outside blade stringers may overlap on opposing sides of the continuous skin.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

FIG. 2 is a side view of a joint end of an example blade stringer according to various embodiments presented herein;

FIG. 3 is a top view of a joint end of an example blade stringer according to various embodiments presented herein;

DETAILED DESCRIPTION

The following detailed description is directed to methods for providing a continuous skin at a structural joint using inside and outside blade stringers. As discussed briefly above, conventional component stringers and corresponding skin terminate at a joint, which requires the use of reinforced termination blocks or fittings in order to prevent composite delamination or failure at high-load areas. The result is a complex structural joint that increases the weight of the structure. This complexity and weight is undesirable when used in conjunction with an aircraft or other vehicle.

Utilizing the concepts described herein, structural components, such as an aircraft wing and fuselage, may be joined together in a manner that allows the composite or other skin to be continuous over the two components being joined without the risk of delamination or load failure. As will be described in detail below, blade stringers may be used on the inside and outside surfaces of the continuous skin. Rather than a traditional "I-beam" stringer configuration that includes a base flange, web, and top cap, the blade stringers described herein may be configured with a base flange and web, without the use of a top cap that is common with traditional stringers, which further reduces the weight and complexity of the components. The webs of the stringers described below may taper downward toward the base flanges towards the ends of the stringers where the components are being joined. The webs may taper within the overlapping area in which the inside and outside stringers overlap on opposing sides of the continuous skin.

Figure 1:
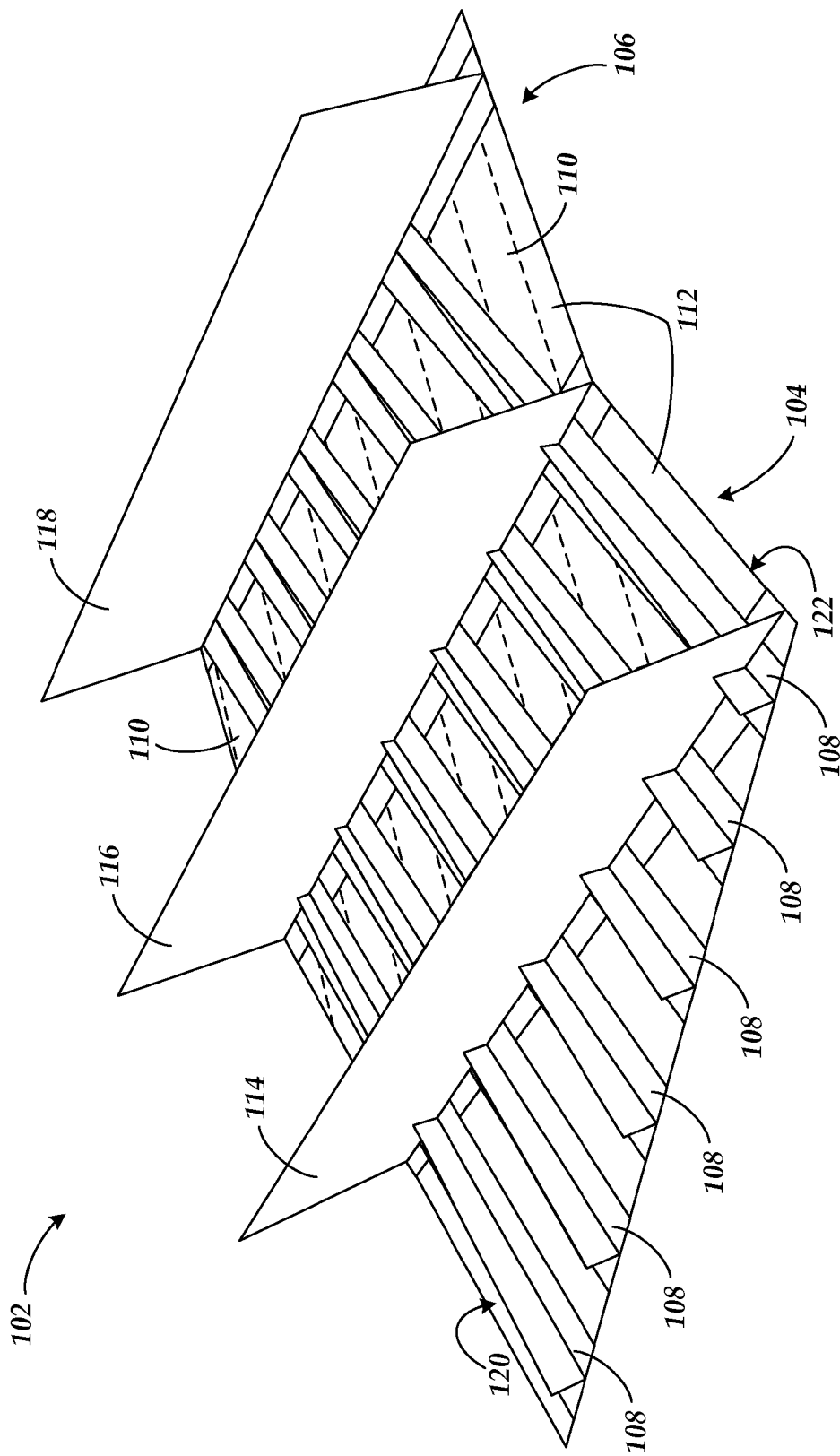
FIG. 1 is a top perspective view of an example of a side-of-body joint utilizing inside blade stringers and outside blade stringers according to various embodiments presented herein.

In the following detailed description, references are made to the accompanying drawings that form a part hereof, and which are shown by way of illustration, specific embodiments, or examples. Referring now to the drawings, in which like numerals represent like elements through the several figures, the structural joint having a continuous skin with inside and outside blade stringers will be described. Turning to FIG. 1, a top perspective view of a structural joint 102 is shown. The structural joint 102 may include a first component 104 and a second component 106 being joined together.

According to one illustrative embodiment, the structural joint 102 may include a side-of-body joint of an aircraft, with the first component 104 being a wing box of the aircraft and the second component 106 being a center box of the aircraft fuselage. An aircraft side-of-body joint is a location in which the aircraft wing is coupled to the fuselage. At this location, high loads are commonly present due to the various forces acting on an aircraft wing and fuselage during flight operations. Composite materials are often used on aircraft and other vehicle components. The side-of-body joint is a particularly challenging application for composite components due to the excessive forces present at the side-of-body joint and the corresponding risk of composite delamination and failure.

As previously discussed, utilizing composite materials at the side-of-body joint typically results in the wing box stringers, center box stringers, and aircraft skin to be terminated at one or more splice plates or fixtures to manage the associated loads. However, the embodiments described herein allow for the skin to be continuous over this joint from the wing box to the center box, without terminating at a splice plate. In doing so, the weight of the structural joint 102 may be decreased while maintaining the ability to adequately manage the loads experienced during flight operations. Although the various embodiments may be discussed with respect to the aircraft side-of-body joint example, the concepts and embodiments described herein may be equally applicable to any structural joint of any vehicle or fixed structure without departing from the scope of this disclosure and the accompanying claims.

As previously stated, the structural joint 102 may include the first component 104 and the second component 106 being joined together. According to one embodiment, the first component 104 may include any number of inside blade stringers 108, one or more structural members 114 attached to the inside blade stringers 108 and/or the continuous skin 112, as well as the continuous skin 112. Similarly, the second component 106 may include any number of outside blade stringers 110, one or more structural members 118 attached to the outside blade stringers 110 and/or the continuous skin 112, as well as the continuous skin 112. Continuing the side-of-body example given above, the first component 104 may include a wing box, which may include a number of ribs represented as the structural member 114, as well as any number and type of wing components that are not shown in FIG. 1, but are traditionally coupled to the ribs and/or stringers and skin associated with the aircraft wing. The second component 106 in the side-of-body example may include a center box of a fuselage, which may include a number of structural members 116, as well as any number and type of fuselage components that are not shown in FIG. 1, but are traditionally coupled to the stringers or skin associated with the aircraft fuselage.

According to one embodiment, the inside blade stringers 108 are configured substantially parallel to one another and are each coupled to an inside surface 120 of the continuous skin 112, while the outside blade stringers 110 are also configured substantially parallel to one another and coupled to an outside surface 122 of the continuous skin 112. The broken lines shown in FIG. 1 represent the outside blade stringers 110 coupled to the opposing side, or outside surface 122, of the continuous skin. As seen in FIG. 1, and as will be described in greater detail below with respect to FIG. 5, the ends of the inside blade stringers 108 and outside blade stringers 110 overlap one another on opposing sides of the continuous skin 112.

A structural member 116, which may include a T-chord or first wing rib, may be coupled to the structural joint 102 at a central location where the first component 104 and second component 106 converge. The structural member 116 may provide support to restrain the structural joint 102 from moving out of plane. The structural members 114, 116, and 118 are only shown in FIG. 1 for clarity purposes. It should be appreciated that the structural joint 102 shown in the various figures represents a partial structure and is not drawn to scale. The structural joint 102 may be any shape and size, with inside blade stringers 108, outside blade stringers 110, and continuous skin 112 having any dimensions.

FIGS. 2 and 3 show side and top views, respectively, of a joint end 202 of a partial inside blade stringer 108 or outside blade stringer 110 according to one embodiment. The inside blade stringers 108 each include an inside stringer base flange 204A that is bonded or otherwise coupled to an inside surface 120 of the continuous skin 112. An inside stringer web 206A projects from the inside stringer base flange 204A to a height 210 at an open edge 208A opposite the inside stringer base flange 204A. Similarly, the outside blade stringers 110 each include an outside stringer base flange 204B that is bonded or otherwise coupled to an outside surface 122 of the continuous skin 112. An outside stringer web 206B projects from the outside stringer base flange 204B to a height 210 at an open edge 208B ("208A" and "208B" generally referred to herein as "208") opposite the outside stringer base flange 204B.

The term "open edge" as used herein refers to an edge that is not coupled to or abutting a top cap or top flange as is typical with conventional "I-beam" stringer configurations. According to various embodiments, the open edge 208 is possible due to the additional strength and other structural advantages provided by the overlap and/or overlap location of the inside blade stringers 108 and the outside blade stringers 110. According to alternative embodiments, the open edge 208 may be replaced by an edge that abuts, continues into, or is coupled to a top cap or top flange in the manner of conventional stringers. However, the open edge 208 may reduce the manufacturing costs and reduce the overall weight of the structural joint 102 and corresponding components as compared to traditional stringer designs.

According to one embodiment, the inside stringer web 206A is trimmed, or tapers, from the height 210 to a reduced height 212 at the joint end 202 of the stringer. Any reduction in strength of the stringer due to the tapering may be offset by the corresponding overlapping stringers on the opposite side of the continuous skin 112. For example, at a location on the first component 104 that is to the left of the structural member 114 in FIG. 1, the inside stringer webs 206A of the inside blade stringers 108 may be at full height, or height 210, providing maximum structural reinforcement and stiffening advantages. As the inside blade stringers 108 extend to through the structural member 114, they begin to overlap the outboard ends of the outside blade stringers 110 on the outside surface 122 of the continuous skin 112. At approximately this position according to one embodiment, the inside stringer webs 206A begin to taper until they reach the reduced height 212 at the outboard ends of the stringers. The outside stringer webs 206B of the outside blade stringers 110 correspondingly taper to the reduced height 212 starting approximately where the overlapping of the inside blade stringers 108 begins, which may be approximately at the structural member 118 in this example.

As the inside stringer webs 206A and the outside stringer webs 206B taper, they may lose a portion of the structural reinforcement and stiffness characteristics that are present when the open edges 208A and 208B are positioned at the height 210 from the inside stringer base flanges 204A and outside stringer base flanges 204B, respectively. However, these losses are offset by the addition of the corresponding overlapping stringer on the opposing side of the continuous skin 112. In other words, when the inside stringer webs 206A of the inside blade stringers 108 are at or near the reduced height 212 at a location on the inside surface 120 of the continuous skin 112, the loads experienced by the structural joint 102 at that location remain controlled since the outside stringer webs 206B of the outside blade stringers 110 on the outside surface 122 of the continuous skin 112 at that same location remain at or near the height 210. Moreover, by tapering the inside stringer webs 206A and the outside stringer webs 206B, the strain within the corresponding webs is reduced, which prevents delamination between the inside stringer webs 206A and inside stringer base flanges 204A, as well as between the outside stringer webs 206B and outside stringer base flanges 204B, that may occur as a result of this strain. In this manner, the first component 104 may be coupled with the second component 106 at the structural joint 102 with the use of continuous skin 112, the inside blade stringers 108, and the outside blade stringers 110, without the use of complex and heavy splice plates.

The height 210 of the inside stringer webs 206A and of the outside stringer webs 206B may depend upon the particular application for which the stringers are designed and the corresponding loads for which the stringers and structural joint 102 will be subjected to. Other dimensions related to the inside blade stringers 108 and outside blade stringers 110, including but not limited to the width and thicknesses of the inside stringer base flange 204A and of the outside stringer base flange 204B, and the thickness of the stringer webs, are also application specific. The reduced height 212 may also depend upon the particular application for the inside blade stringers 108 and outside blade stringers 110. According to one embodiment, the reduced height is approximately zero so that the inside stringer webs 206A and outside stringer webs 206B taper from the height 210 to a reduced height 212 that is approximately flush an outer surface of the inside stringer base flange 204A and an outer surface of the outside stringer base flange 204B, respectively.

It should be appreciated that the tapering characteristics may also vary according to the specific application. For example, the tapering angle 214 in which the open edge 208 tapers downward from horizontal may depend, among other design criteria, on the desired overlap area of the structural joint 102 as will be discussed in greater detail below with respect to FIG. 5. According to one illustrative embodiment, the height 210 of the inside blade stringers 108 and outside blade stringers 110 may be between 2.5-3 inches, tapering down to a reduced height 212 of 0 inches at the termination point of the stringers, which may be between 55-65 inches from the point at which the tapering begins. In doing so, the tapering angle 214 may be approximately 2.75 degrees, or between 2.5-3 degrees.

According to one embodiment in which the structural joint 102 includes an aircraft side-of-body joint, the inside blade stringers 108 may begin at section 12 of the aircraft wing and traverse the wing until terminating at section 11 close or within the wing box. Similarly, the outside blade stringers 110 may begin within the center box of the aircraft fuselage and end at or near the second rib of the wing. It should be understood that these examples are provided for illustrative purposes only and that the actual characteristics of the inside blade stringers 108 and the outside blade stringers 110 may vary depending on the particular implementation.

The inside blade stringers 108 and outside blade stringers 110 may be made of any appropriate materials depending on the particular application and the loads in which the structural joint 102 is to be subjected. According to various embodiments, the inside blade stringers 108 and outside blade stringers 110, as well as the continuous skin 112, may be manufactured from composite materials, such as composite materials having a high axial modulus for increased stiffness. Composite materials commonly provide high strength characteristics with a significant weight savings as compared to conventional metallic materials. As discussed above, the overlapping inside/outside stringer configuration of the structural joint 102 described herein allows for the use of continuous skin 112 across the joint without the risk of delamination or failure, and without the use of heavy and complex splice plates.

Figure 4:
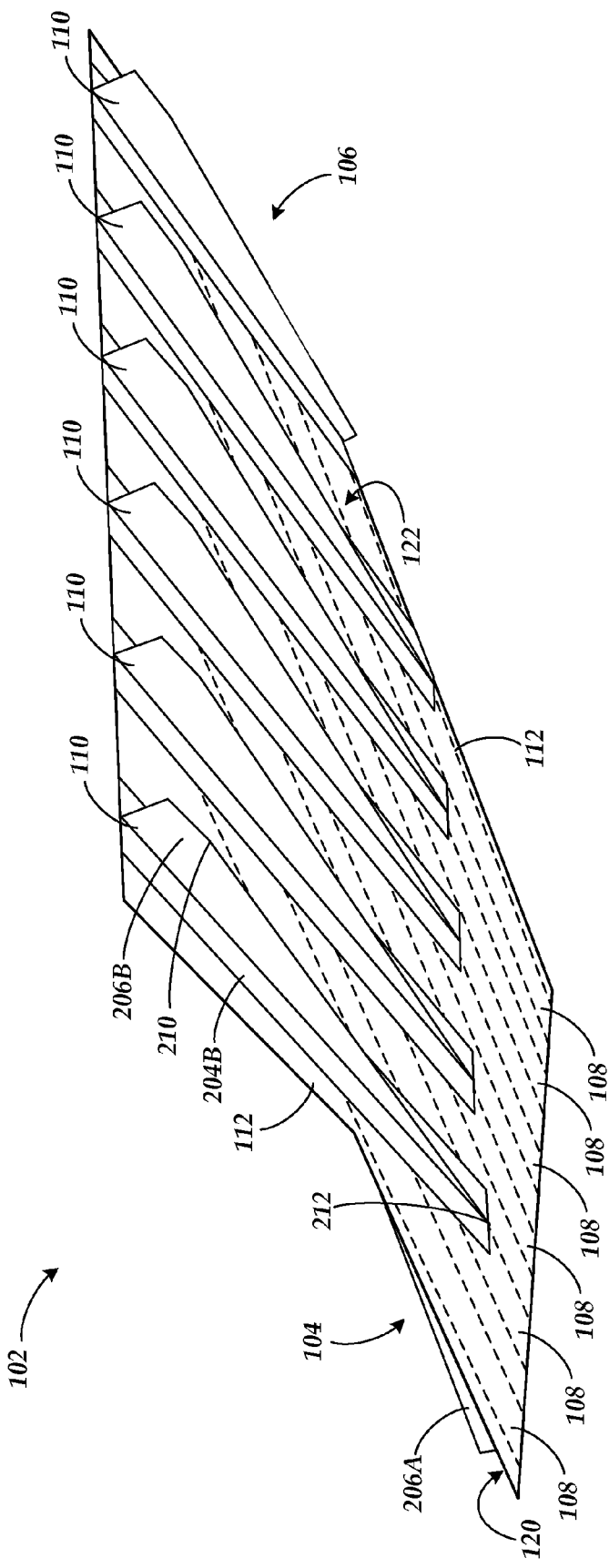
FIG. 4 is a bottom perspective view of an example of a side-of-body joint utilizing inside blade stringers and outside blade stringers according to various embodiments presented herein.

FIG. 4 shows a bottom perspective view of the structural joint 102 of FIG. 1 according to one embodiment. The structural members 114, 116, and 118 have been omitted for clarity. As shown, according to this embodiment, the outside blade stringers 110 are arranged substantially parallel to one another and extend into the structural joint 102 from the second component 106. The outside stringer base flanges 204B are bonded or otherwise coupled to the outside surface 122 of the continuous skin 112. The outside stringer webs 206B taper from the height 210 to the reduced height 212 at the outboard ends of the stringers. As seen from the broken lines representing the inside blade stringers 108 coupled to the inside surface 120 of the continuous skin 112, the outside blade stringers 110 and the inside blade stringers 108 overlap on opposing sides of the structural joint 102.

Figure 5:
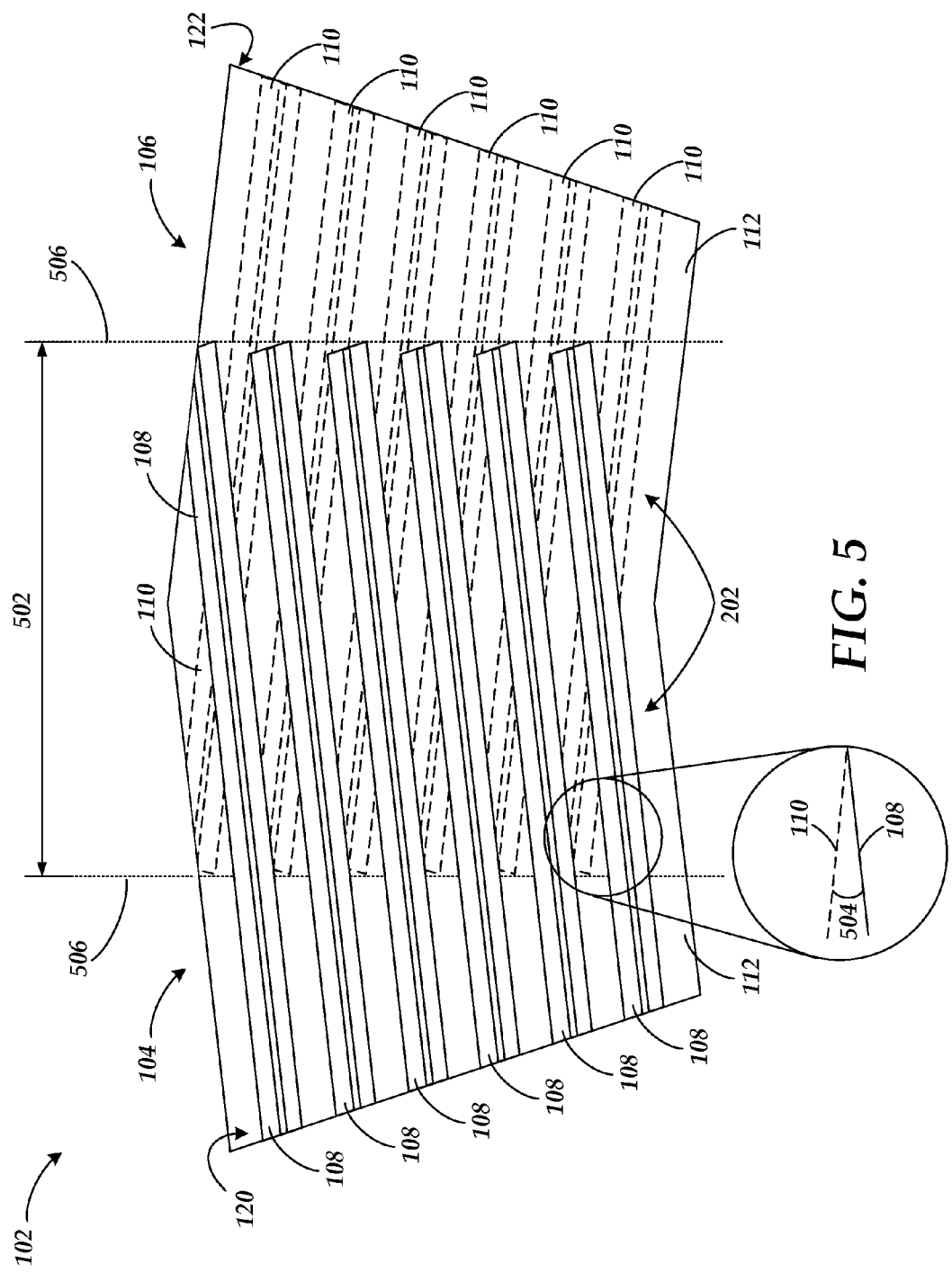
FIG. 5 is a top view of an example of a side-of-body joint utilizing inside blade stringers and outside blade stringers with an enlargement illustrating an overlap angle according to various embodiments presented herein.

Referring now to FIG. 5, further aspects of the structural joint 102 will be described while referencing a top view of the example joint. The top view clearly illustrates one example of the overlap between the inside blade stringers 108 of the first component 104 and the outside blade stringers 110 of the second component 106. According to this example embodiment, the inside blade stringers 108 extend from the first component 104 into the structural joint 102. As an example, the inside blade stringers 108 may extend from a wing tip of an aircraft wing into a side-of-body joint, which is represented as the structural joint 102. The outside blade stringers 110 extend from the second component 106, such as a center box of an aircraft fuselage, into the structural joint 102. The inside blade stringers 108 are coupled to the inside surface 120 of the continuous skin 112, while the outside blade stringers 110 are coupled to the outside surface 122 of the continuous skin 112 as depicted by the broken lines.

The inside blade stringers 108 and the outside blade stringers 110 overlap on opposing sides of the continuous skin 112 within an overlap area 502, beginning at overlap locations 506. The specific size and shape of the overlap area 502 may depend on the specific application for the structural joint 102. For example, the ends of the inside blade stringers 108 and outside blade stringers 110 may vary in length and termination location so that they may or may not align as shown in FIG. 5. According to various embodiments, the inside blade stringers 108 and outside blade stringers 110 overlap on opposing sides of the continuous skin 112 according to an overlap angle 504 with respect to one another. The enlargement shown in FIG. 5 highlights the overlap angle 504. By overlapping at an angle, the stiffness provided by the inside blade stringers 108 and outside blade stringers 110 at the structural joint 102 is increased.

According to one embodiment, the overlap angle 504 is a non-zero overlap angle that is approximately equivalent to the sweep angle of an aircraft wing with respect to the fuselage. In this example, the inside blade stringers 108 extend through the aircraft wing and intersect the fuselage at the side-of-body joint, or structural joint 102. The outside blade stringers 110 may be positioned parallel to a lateral or pitch axis of the aircraft so that the overlap angle 504 corresponds to the sweep angle of the aircraft wings. This overlap angle 504, or sweep angle according to the given example embodiment, may be between 30 to 50 degrees depending on the dihedral angle and wing span, among other aircraft variables.

Figure 6:
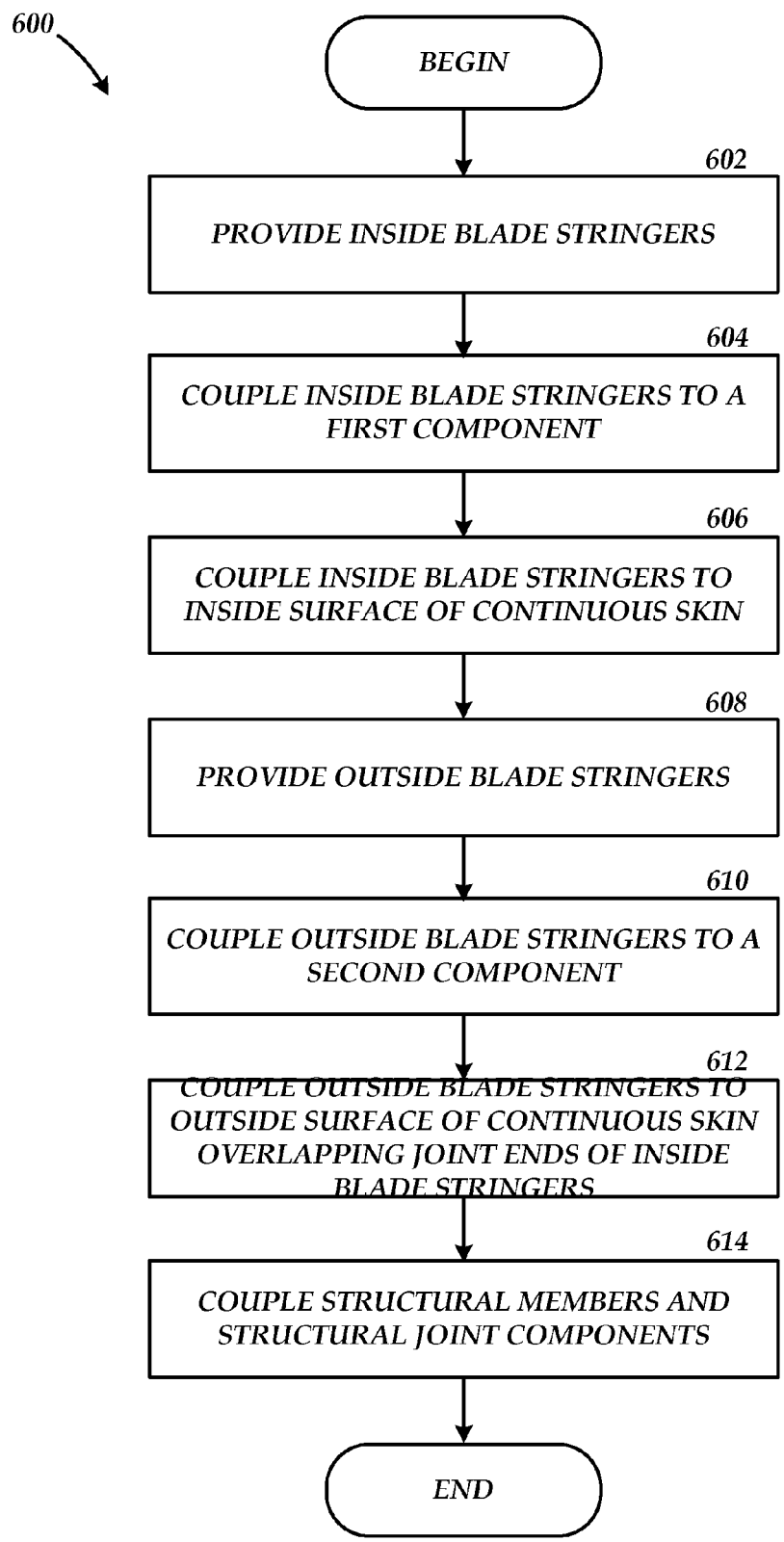
FIG. 6 is a process flow diagram illustrating a method for creating a structural joint utilizing inside blade stringers, outside blade stringers, and continuous skin according to various embodiments presented herein.

Turning now to FIG. 6, an illustrative routine 600 for creating a structural joint utilizing inside blade stringers 108, outside blade stringers 110, and continuous skin 112 will now be described in detail. It should be appreciated that more or fewer operations may be performed than shown in the figures and described herein. These operations may also be performed in a different order than those described herein.

The routine 600 begins at operation 602, where the inside blade stringers 108 are provided. As described above, the number and configuration of the inside blade stringers 108 may depend upon the specific application for which the structural joint 102 is to be used. The inside blade stringers 108 may each include an inside stringer base flange 204A and an inside stringer web 206A projecting upwards from the flange to an open edge 208 positioned a height 210 from the flange. At the desired location, such as at a location along each inside blade stringer 108 in which the stringer extends into the overlap area 502 proximate to the joint end 202 of the stringer, the inside stringer web 206A tapers from the height 210 to a reduced height 212 according to a tapering angle 214 as described above.

From operation 602, the routine 600 continues to operation 604, where the inside blade stringers 108 are coupled to a first component 104. The first component 104 may include any number and type of systems or devices that define the first component 104 being joined with the second component 106 at the structural joint 102. For example, the first component 104 may include aircraft ribs, spars, flight control and fuel systems, and the like. The structural member 114 shown in FIG. 1 and described above may represent an aircraft rib or other partial or entire portion of the first component 104.

The routine 600 continues from operation 604 to operation 606, where the inside blade stringers 108 are coupled to the continuous skin 112. According to one embodiment, the inside stringer base flanges 204A are bonded or otherwise coupled to the inside surface 120 of the continuous skin 112 so that the joint ends 202 of the stringers terminate in the desired locations within the overlap area 502. From operation 606, the routine 600 continues to operation 608, where the outside blade stringers 110 are provided. It should again be appreciated that the operations described herein may occur in a different order or simultaneously without departing from the scope of this disclosure. For example, the outside blade stringers 110 and inside blade stringers 108 may be provided and coupled to the continuous skin 112 substantially simultaneously. However, for clarity, these operations are described sequentially.

As described above, the number and configuration of the outside blade stringers 110 may depend upon the specific application for which the structural joint 102 is to be used. The outside blade stringers 110 may each include an outside stringer base flange 204B and an outside stringer web 206B projecting upwards from the flange to an open edge 208 positioned a height 210 from the flange. At the desired location, such as at a location along each outside blade stringer 110 in which the stringer extends into the overlap area 502 proximate to the joint end 202 of the stringer, the outside stringer web 206B tapers from the height 210 to a reduced height 212 according to a tapering angle 214.

From operation 608, the routine 600 continues to operation 610, where the outside blade stringers 110 are coupled to the second component 106. As stated above with respect to the first component 104, the second component 106 may include any number and type of systems or devices that define the second component 106 being joined with the first component 104 at the structural joint 102. For example, the second component 106 may include fuselage spars, longerons, flight control and fuel systems, and the like. The structural member 118 shown in FIG. 1 and described above may represent center box component or other partial or entire portion of the second component 106.

The routine 600 continues from operation 610 to operation 612, where the outside blade stringers 110 are coupled to the continuous skin 112. According to one embodiment, the outside stringer base flanges 204B are bonded or otherwise coupled to the outside surface 122 of the continuous skin 112 so that the joint ends 202 of the stringers terminate in the desired locations within the overlap area 502. From operation 612, the routine continues to operation 614, where any additional structural members may be coupled to the appropriate structural joint components, and the routine 600 ends. For example, according to one embodiment, the T-chord, which is represented in FIG. 1 as the structural member 116, may be bonded or mechanically fastened to the inside blade stringers 108, the outside blade stringers 110, and the continuous skin 112 to provide the structural joint 102 with the desired additional stiffness and strength characteristics.

Based on the foregoing, it should be appreciated that technologies for creating a structural joint utilizing overlapping inside and outside stringers with a continuous skin have been presented herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A structural joint, comprising:
a continuous skin having an inside surface and an outside surface;
a plurality of inside blade stringers coupled to the inside surface of the continuous skin and configured substantially parallel to one another, each inside blade stringer having a T-shaped cross section and a joint end; and a plurality of outside blade stringers coupled to the outside surface of the continuous skin and configured substantially parallel to one another, each outside blade stringer having a T-shaped cross section and a joint end,
wherein an aircraft wing includes a non-zero sweep angle and the joint ends of the plurality of inside blade stringers and of the plurality of outside blade stringers overlap at an angle equal to the sweep angle of the aircraft wing on opposing sides of the continuous skin.

2. The structural joint of claim 1,
wherein each inside blade stringer comprises an inside stringer base flange coupled to the inside surface of the continuous skin and an inside stringer web projecting away from the inside stringer base flange and tapering to a reduced height at the joint end of the inside blade stringer, and wherein each outside blade stringer comprises an outside stringer base flange coupled to the outside surface of the continuous skin and an outside stringer web projecting away from the outside stringer base flange and tapering to a reduced height at the joint end of the outside blade stringer.

3. The structural joint of claim 2, wherein the inside stringer web comprises an open edge opposite the inside stringer base flange that tapers to the reduced height at the joint end of the inside blade stringer, and wherein the outside stringer web comprises an open edge opposite the outside stringer base flange that tapers to the reduced height at the joint end of the outside blade stringer.

4. The structural joint of claim 2, wherein the reduced height comprises a height flush with an outer surface of the inside stringer web or of the outside stringer web.

5. The structural joint of claim 1, wherein the joint ends of the plurality of inside blade stringers and of the plurality of outside blade stringers overlap on opposing sides of the continuous skin according to a non-zero overlap angle.

6. The structural joint of claim 5, wherein the non-zero overlap angle comprises a sweep angle of an aircraft wing.

7. The structural joint of claim 1, wherein the structural joint comprises an aircraft side-of-body joint joining a wing box and a center box.

8. The structural joint of claim 1, further comprising a structural member coupled to the plurality of inside blade stringers, the plurality of outside blade stringers, and the continuous skin.

9. The structural joint of claim 1, wherein each inside stringer web begins tapering to a reduced height at approximately an overlap location where the inside stringer begins overlapping an outside blade stringer, and wherein each outside stringer web begins tapering to the reduced height at approximately an overlap location where the outside stringer begins overlapping an inside blade stringer.

10. A method of joining two structures, the method comprising:
providing a plurality of inside blade stringers, each of the plurality of inside blade stringers comprising an inside stringer base flange and an inside stringer web projecting away from the inside stringer base flange to a height at an open edge opposite the inside stringer base flange and tapering to a reduced height at a joint end of the inside blade stringer, wherein the inside stringer base flange extends beyond opposing surfaces of the inside stringer web;
coupling the plurality of inside blade stringers to a first structure;
coupling the inside stringer base flange of each of the plurality of inside blade stringers to an inside surface of a continuous skin;
providing a plurality of outside blade stringers, each of the plurality of outside blade stringers comprising an outside stringer base flange and an outside stringer web projecting away from the outside stringer base flange to a height at an open edge opposite the outside stringer base flange and tapering to a reduced height at a joint end of the outside blade stringer, wherein the outside stringer base flange extends beyond opposing surfaces of the outside stringer web;
coupling the plurality of outside blade stringers to a second structure; and
coupling the outside stringer base flange of each of the plurality of outside blade stringers to an outside surface of the continuous skin, wherein an aircraft wing includes a non-zero sweep angle and the joint end of each inside blade stringer overlaps the joint end of each outside blade stringer at an angle equal to the sweep angle of the aircraft wing on opposing sides of the continuous skin.

11. The method of claim 10, wherein the reduced height comprises a height flush with an outer surface of the inside stringer web or of the outside stringer web.

12. The method of claim 10, further comprising coupling a structural member to the plurality of inside blade stringers, the plurality of outside blade stringers, and the continuous skin.

13. The method of claim 10, wherein coupling the inside stringer base flange of each of the plurality of inside blade stringers to the inside surface of the continuous skin and coupling the outside stringer base flange of each of the plurality of outside blade stringers to the outside surface of the continuous skin comprises coupling the plurality of inside blade stringers and the plurality of outside blade stringers to opposing surfaces of the continuous skin at a non-zero overlap angle with respect to one another.

14. The method of claim 13, wherein the non-zero overlap angle comprises a sweep angle of an aircraft wing.

15. The method of claim 10, wherein coupling the plurality of inside blade stringers to a first structure comprises coupling the plurality of inside blade stringers to at least one component of an aircraft wing, and wherein coupling the plurality of outside blade stringers to a second structure comprises coupling the plurality of outside blade stringers to at least one component of a center box of an aircraft.

16. A structural joint, comprising:
a continuous skin;
a plurality of inside blade stringers configured substantially parallel to one another, each inside blade stringer comprising an inside stringer base flange coupled to an inside surface of the continuous skin and an inside stringer web having an open edge spaced a distance from the inside stringer base flange, the distance decreasing to a reduced height at a joint end of the inside blade stringer; and
a plurality of outside blade stringers configured substantially parallel to one another, each outside blade stringer comprising an outside stringer base flange coupled to an outside surface of the continuous skin and an outside stringer web having an open edge spaced a distance from the outside stringer base flange, the distance decreasing to a reduced height at a joint end of the outside blade stringer,
wherein an aircraft wing includes a non-zero sweep angle and the joint ends of the plurality of inside stringers and of the plurality of outside blade stringers overlap at an angle equal to the sweep angle of the aircraft wing on opposing sides of the continuous skin.

17. The structural joint of claim 16, wherein the structural joint comprises an aircraft side-of-body joint that couples a wing box of the aircraft wing to a center box of an aircraft fuselage.

18. The structural joint of claim 17, further comprising an aircraft rib coupled to the plurality of inside blade stringers, the plurality of outside blade stringers, and the continuous skin.

* * * * *